US012009762B2

(12) United States Patent
Oehring et al.

(10) Patent No.: US 12,009,762 B2
(45) Date of Patent: Jun. 11, 2024

(54) WIRELINE POWER SUPPLY DURING ELECTRIC POWERED FRACTURING OPERATIONS

(71) Applicant: U.S. Well Services, LLC, Houston, TX (US)

(72) Inventors: Jared Oehring, Houston, TX (US); Brandon Neil Hinderliter, Houston, TX (US); Joel Broussard, Lafayette, LA (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

(21) Appl. No.: 17/968,532

(22) Filed: Oct. 18, 2022

(65) Prior Publication Data

US 2023/0109325 A1 Apr. 6, 2023

Related U.S. Application Data

(63) Continuation of application No. 15/235,788, filed on Aug. 12, 2016, now Pat. No. 11,476,781, which is a continuation-in-part of application No. 15/202,085, filed on Jul. 5, 2016, now Pat. No. 10,337,308, which is a continuation of application No. 13/679,689, filed on Nov. 16, 2012, now Pat. No. 9,410,410.

(60) Provisional application No. 62/204,842, filed on Aug. 13, 2015.

(51) Int. Cl.
*E21B 43/26* (2006.01)
*E21B 43/267* (2006.01)
*F01D 15/08* (2006.01)
*F04B 35/04* (2006.01)
*F04B 49/20* (2006.01)
*H02P 1/30* (2006.01)

(52) U.S. Cl.
CPC ............... *H02P 1/30* (2013.01); *E21B 43/26* (2013.01); *E21B 43/267* (2013.01); *F01D 15/08* (2013.01); *F04B 35/04* (2013.01); *F04B 49/20* (2013.01); *E21B 43/2607* (2020.05)

(58) Field of Classification Search
CPC ............................. E21B 43/26; E21B 43/2607
See application file for complete search history.

(56) References Cited

U.S. PATENT DOCUMENTS

| | | | |
|---|---|---|---|
| 6,765,304 B2 * | 7/2004 | Baten | F02B 63/04 290/1 A |
| 7,388,303 B2 * | 6/2008 | Seiver | H02J 3/06 174/70 B |
| 8,789,601 B2 * | 7/2014 | Broussard | E21B 43/26 166/308.1 |
| 8,870,990 B2 * | 10/2014 | Marks | E21B 43/2607 96/138 |
| 9,587,649 B2 * | 3/2017 | Oehring | H02K 9/04 |

(Continued)

*Primary Examiner* — Kenneth L Thompson
(74) *Attorney, Agent, or Firm* — Hogan Lovells US LLP

(57) ABSTRACT

A system and method for supplying electric power to various pieces of fracturing equipment in a fracturing operation with gas powered generators. The system and method also includes switch gears, auxiliary trailers, transformers, power distribution panels, new receptacles, and cables to supply three-phase power to electric fracturing equipment. The switchgear in the power supply system is weatherproof and able to endure the wear and tear of mobilization. The novel system and method provide clean and quiet electricity to all the equipment on site.

11 Claims, 4 Drawing Sheets

(56) References Cited

U.S. PATENT DOCUMENTS

| | | | |
|---|---|---|---|
| 10,246,984 B2* | 4/2019 | Payne | E21B 44/00 |
| 10,815,978 B2* | 10/2020 | Glass | F04B 15/02 |
| 11,109,508 B1* | 8/2021 | Yeung | E21B 43/26 |
| 11,181,107 B2* | 11/2021 | Oehring | F01D 15/08 |
| 11,476,781 B2* | 10/2022 | Oehring | F04B 49/20 |
| 2013/0306322 A1* | 11/2013 | Sanborn | E21B 43/2607 |
| | | | 166/308.1 |

* cited by examiner

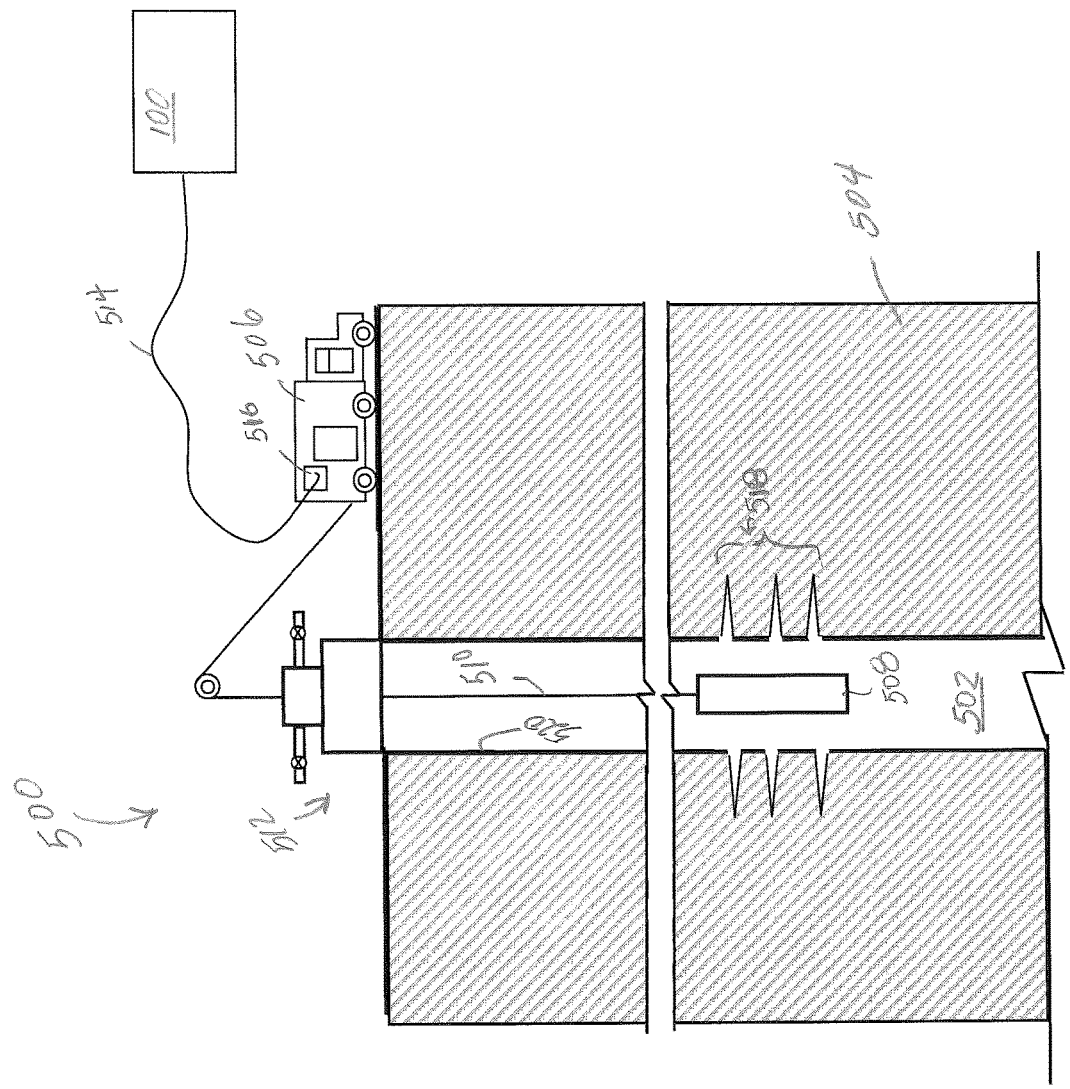

WIRELINE POWER SUPPLY DURING ELECTRIC POWERED FRACTURING OPERATIONS

CROSS-REFERENCE TO RELATED APPLICATIONS

This application is a continuation of U.S. patent application Ser. No. 15/235,788 filed on Aug. 12, 2016, now U.S. Pat. No. 11,476,781 issued Oct. 18, 2022, which claims priority to U.S. Provisional Patent Application No. 62/204,842 filed on Aug. 13, 2015 and is a continuation-in-part of and claims priority to and the benefit of U.S. patent application Ser. No. 15/202,085 filed Jul. 5, 2016, now U.S. Pat. No. 10,337,308 issued Jul. 2, 2019, which is a continuation and claims priority to and the benefit of U.S. patent application Ser. No. 13/679,689 filed Nov. 16, 2012, now U.S. Pat. No. 9,410,410 issued Aug. 9, 2016, the full disclosures of which are hereby incorporated by reference herein for all purposes.

BACKGROUND OF THE INVENTION

1. Technical Field

This invention relates generally to hydraulic fracturing and more particularly to systems and methods for supplying electric power to all components in a hydraulic fracturing operation.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracking) operations typically require powering numerous components in order to recover oil and gas resources from the ground. For example, hydraulic fracturing usually includes pumps that inject fracking fluid down the wellbore, blenders that mix proppant into the fluid, cranes, wireline units, and many other components that all must perform different functions to carry out fracking operations.

Pumping the fracturing fluid into the well at high pressure creates fractures in a subterranean formation so that hydrocarbons have new channels through which to flow into the well. One fracking method is commonly called plug and perf. Perforating refers to an operation where a perforating gun is lowered by wireline into the casing of a well with a plug attached. The plug is set to isolate between different zones of the formation to direct fluid through the new perforations and into unfractured sections of the shale. Typically, an electrical current is sent down the well via a wireline that attaches to the perforating gun. An electrical charge is used to detonate shaped charges in the gun that form metal jets which perforate through the casing and cement. The perforating gun is then pulled out of the wellbore.

In many wells, the fracking operation is carried out in stages. Typically, a first stage of the well will be perforated and hydraulically fractured. As desired, a plug can be placed at the end of the first stage, and a second stage can then be perforated and hydraulically fractured. With advancements in technology, such multi-stage fracking has become the norm. Fracturing in stages can be completed multiple times to cover the horizontal distance of the wellbore.

Usually in fracturing systems, the fracturing equipment runs on diesel generated power. However, diesel is more expensive, is less environmentally friendly, less safe, and heavier to transport than natural gas. The large amounts of diesel fuel needed to power traditional fracturing operations require constant transportation and delivery by diesel tankers onto the well site. This results in significant carbon dioxide emissions. Some systems have tried to eliminate partial reliance on diesel by creating bi-fuel systems. These systems blend natural gas and diesel, but have not been very successful. It is thus desirable that a natural gas powered fracturing system be used in order to improve safety, save costs, and provide benefits to the environment over diesel powered systems.

In many known fracking systems, as noted above, the power to run the components in a fracturing system is provided by diesel or other internal combustion engines. Such engines can be very powerful, but have certain disadvantages. For example, diesel engines are very heavy, and so require the use of a large amount of heavy equipment, including trailers and trucks, to transport the engines to and from a wellsite. In addition, such engines are not clean, but generate large amounts of exhaust and pollutants, which can cause environmental hazards, among other problems. Onsite refueling, especially during operations, presents increased risks of fuel leaks, fires, and other accidents.

SUMMARY OF THE INVENTION

Various illustrative embodiments of a system and method for providing electricity to a hydraulic fracturing operation are provided herein. In accordance with an aspect of the disclosed subject matter, the method and system of the present invention provide an auxiliary trailer powered by natural gas run turbines for powering electric wireline equipment to be used in hydraulic fracturing operations. The wireline equipment can include an electric wireline unit, crane truck, and workshop trailer. Further, all of the equipment relating to fracturing operations can be powered by the electricity generated and controlled by the present system including third party equipment.

Embodiments of systems and methods of the present disclosure are designed to provide power to an hydraulic fracturing operation through the use of natural gas powered turbines and an auxiliary trailer. In one embodiment at least one turbine generator driven by natural gas provides the main source of electric power. A second auxiliary trailer with multiple turbines can be provided to supply additional power to the fracturing equipment. Multiple turbines can power a single auxiliary trailer, or a single turbine can power multiple auxiliary trailers depending on the total power demand and the output of the turbine generators. The trailers can include transformers to step the electricity generated by the turbines down to the needed voltage for the hydraulic fracturing equipment. It is also possible to have the transformers physically separate from the auxiliary trailer and electrically connected with cables. They also include a power distribution panel to supply power out to the wireline unit, crane truck, and workshop trailer. There are also newly designed receptacles so that the wireline equipment can be connected quickly and efficiently and new cables, which are able to detach at both ends for fast move in rig up and fast disassembly and take down.

Embodiments of systems and methods of the present disclosure include an auxiliary trailer that also can plug into the existing power grid to power the fracturing equipment. This embodiment will include a special cable that will plug into the trailer and branch the three phases into three power plugs that are color coded and can be between 550V-600V at around 500 amperes to supply wireline equipment. An example of a plug used in this embodiment is a RigPower plug (4140 World Houston Pkwy., Ste. 130, Houston Texas, 77032, www.rigpower.com) but other similar plugs can also be used.

Embodiments of systems and methods of the present invention also include any connection required on the transformer or power junction box so that third party equipment can plug into and receive power from the trailer. Third party equipment can include wireline, water transfer pumps, workover rigs, coil tubing, office trailers, housing trailers, heaters, light plants, production equipment, communication equipment, and safety equipment.

Embodiments of the invention include two separate sets of turbines, each set having two turbines and each set being connected to a separate switch gear, which in turn is connected to a set of transformers. The transformers step down the power from the turbines and switchgears to power a set of pump trailers. The switch gears are also attached to auxiliary trailers which power fracturing equipment such as sand equipment, a hydration unit, one or more blenders, a crane, a wireline tool trailer and a wireline truck. Power is provided from the turbines, to the switchgear, then to the auxiliary trailer unit.

Embodiments of the invention can also include auxiliary trailer units with the transformers in the rear of the unit and the connection panel up from near the gooseneck of the trailer. Further, the switchgear trailer can have connections for incoming power from the turbines and outgoing power to the auxiliary unit. On the other side of the trailer from these connections are connections for outgoing power to more transformers for the fracturing pumps.

Embodiments of the invention include switchgears, which are built to be weatherproof, and able to withstand the wear and tear of mobilization. The switchgears include shock absorbers, placed near the mounting bolts holding the switchgear housing to the trailer frame and near the bolts holding the externally mounted control panels in place. The invention includes two air conditioning units that are installed within the switchgear units to monitor the temperature and to make sure the internal electronics stay within their operating parameters and do not overheat. Embodiments can include two units or a single unit. The trailer has standard air brakes and a front landing gear to ensure the switchgear will not roll or shift its base.

Embodiments of the invention can also include external decks/walkways that have hand rails in place for meeting the Occupational Health and Safety Association's standards. The whole switchgear is constructed according to the standards of the National Environmental Management Act, American National Standards Institute, and the National Fire Protection Association. It includes vacuum circuit breakers, which are installed in draw-out enclosures, which allow them to be removed and replaced in a timely manner. The switchgear is also designed in accord with the Institute of Electrical and Electronics Engineers standards C37.04, C37.06, and C37.20.2 with the following ratings: Maximum Voltage (rms): 13.8 kV, ANSI Rating Basis: MVA Rated, Operating Voltage: 13.8 kV, Short Circuit Current Rating: 25 KA, Close Voltage: 125 VDC, Trip Voltage: 125 VDC.

Further embodiments include that the switchgear is insulated with fire resistant material and that the doors on the trailer can be locked from the outside. The inside of the switchgear is illuminated with standard 120V LED lights and also includes an emergency light if the trailer loses power. The switchgear can receive an emergency off signal that is hardwired from the datavan that shuts down the compressors and any running equipment, and also will disconnect the circuit breakers in the trailer.

The Auxiliary Trailer unit contains a Variable Frequency Drive house which is also known as the Power Control Room, and a transformer mounted onto a single trailer. This can be used to control the blender discharge motor, the blender hydraulic motor, the hydration unit hydraulic motor, blower motors, fan motors, heaters, and other onboard electronics on either the blender or hydration units. The discharge motor on the blender can be speed controlled, and the other motors are run on or off at single speed. The VFD can also contain the soft starter for the smaller blower motors for cooling.

Embodiments of the invention include a transformer unit that is visible on the rear and sits above the triple axels. The transformer is used to convert 13.8 kV to 600 V to provide power to the VFD house. Embodiments of the invention include auxiliary trailers with a 3000 kVA transformer and another embodiment can include a 3500 kVa transformer.

Further, the auxiliary trailer can provide power to the primary and secondary blenders, the hydration unit, the sand conveyor belt, which can be a dual belt, and the datavan. The fleet can contain either one single Auxiliary trailer unit or two, where the secondary blender can be powered at all times by the second auxiliary trailer unit.

Embodiments of the invention can also include a secondary trailer unit that will help with the power cable management. This creates two separate power grids and increases the redundancy of the operation. Two turbines in this embodiment will power a single switchgear which will provide power to half of the fracturing pumps, and a single auxiliary trailer, and if one pair of turbines shuts down due to a mechanical failure, electrical fault, or overheating, the second pair of turbines will allow all the sand laden fluid to be flushed before it settles in the pipes. The primary and secondary blenders are powered by separate auxiliary trailers to allow for a quick blender swap and to minimize downtime.

In another embodiment, the auxiliary trailer units can include connections for the wireline equipment. The sand equipment can also contain connections so that the plug points can be the same for sand and wireline equipment. Each auxiliary unit in this embodiment will have identical connections and one will be used to power the wireline equipment, while the other will be used to power the sand equipment. Another embodiment can have separate types of plugs for sand and wireline equipment respectively. Another embodiment includes plugs for sand equipment on one auxiliary trailer and different plugs for wireline on that trailer, but no sand equipment plugs on the second auxiliary trailer.

Other aspects and features of the present invention will become apparent to those of ordinary skill in the art after reading the detailed description herein and the accompanying figures.

BRIEF DESCRIPTION OF DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

FIG. 5 is a side sectional view of a wellsite.

DETAILED DESCRIPTION

Figure 1:
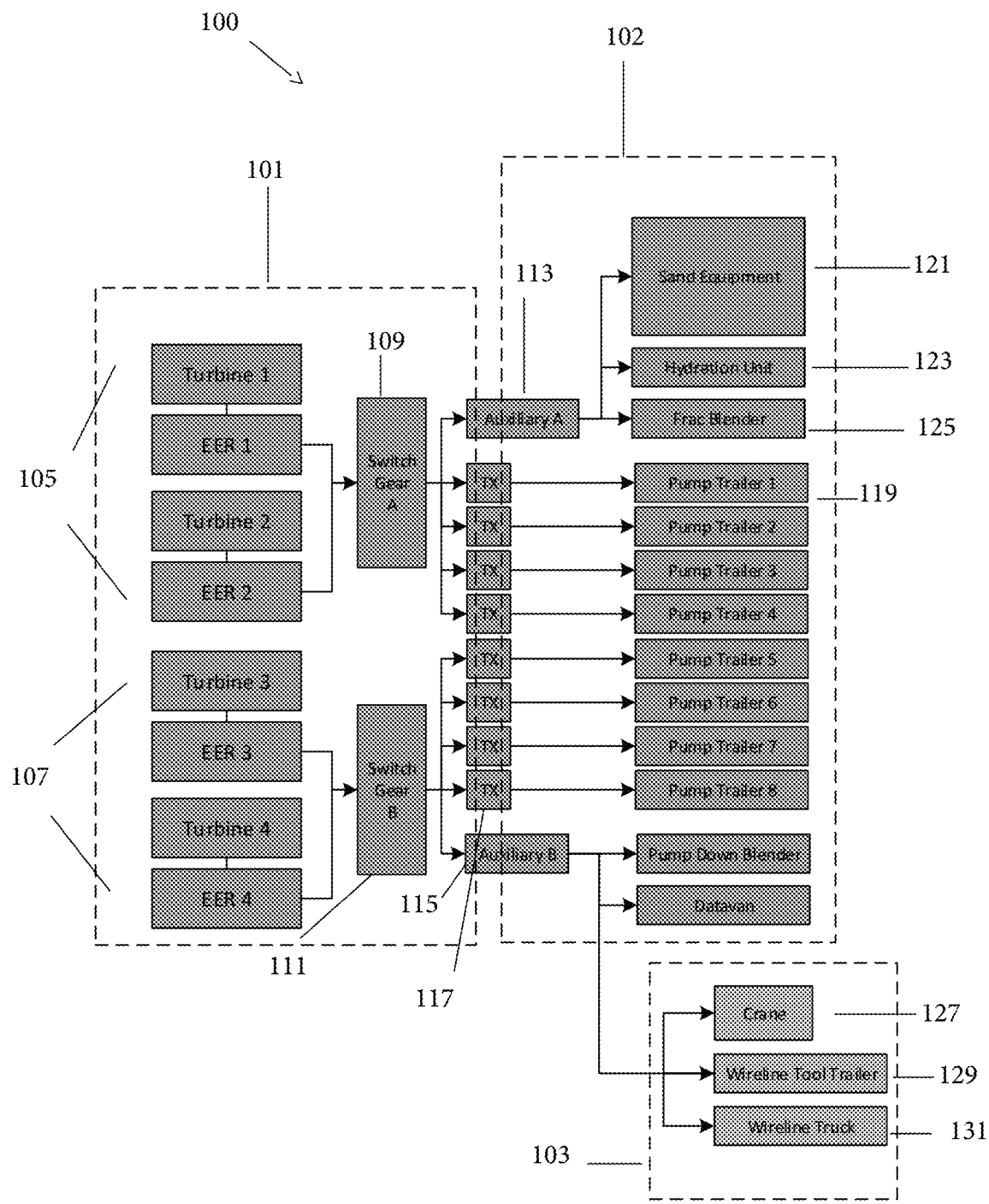
FIG. 1 is a block diagram of an embodiment of the present invention.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

The present invention generally relates to an hydraulic fracturing system and method that is powered by electricity. The system and method are designed to deliver fracturing fluid to a well site. Traditionally, hydraulic fracturing is accomplished when a slurry of fluids and solids is injected into a reservoir to create fractures in the rock formation. Chemicals and fluids are mixed with proppants such as sand and ceramic beads and then pumped into the wellbore at high pressure with hydraulic pumps. The solids remain in the fractures that are created helping to keep them open, while some of the fluids return back out of the well.

One solution to the problems presented by the use of diesel and other engines in fracking operations is to power the equipment associated with the fracking operation using electric motors. Electric motors have the advantage of weighing less than diesel engines, so that they are easier to transport to and from a fracking well site. In fact, in some instances electric motor and pump combinations can be transported to a well site two to a trailer, cutting in half the number of heavy trailers required to be moved to a well site.

In order to fully exploit the advantages provided by powering hydraulic fracking equipment using electric motors, the present invention includes systems and methods for powering numerous other components of a hydraulic fracturing operation using natural gas. The system includes electric wireline units, crane trucks, and workshop trailers, with the goal of reducing or eliminating reliance on diesel motors. The invention also includes a self-contained closed circuit power grid for providing clean and quiet electricity to all equipment on site.

Certain embodiments of the present invention include a set of natural gas powered turbines that produces electricity to power electric motors and pumps used in hydraulic fracturing operations for providing pressurized fracturing fluid. In an example, the invention can include the following features: turbine engine generators fueled by natural gas to supply electricity to electric motors that power hydraulic fracturing pumps in a hydraulic fracturing operation; transformers to step the electricity to the needed voltage of the motors; a power distribution panel to supply power out to other fracturing equipment such as the wireline unit, crane truck, workshop trailer, and other components of the system; new receptacles so that the wireline equipment can be connected quickly and efficiently; and cables that are detachable at both ends for fast move in rig up as well as fast rig down and move out. Further electric motors and pumps are lighter and therefore it is desirable to have a fracturing system that runs on electricity that is taken from an existing power grid or generated from turbines that run on natural gas.

FIG. 1 shows in schematic form an example of a fracturing system 100 at a well site with a power generation system 101, fracturing equipment 102, and wireline equipment 103. In this example, the power generation system 101 contains 10 total trailers with two natural gas powered turbine sets 105 and 107 that have two turbines apiece, but can have more, and each turbine is accompanied by an Electronic Equipment and Control Room (EER). In the illustrated example, the turbine sets 105 and 107 provide electrical power to switch gears 109 and 111, which in turn monitor and control electrical power provided to transformers 117. A single turbine set consists of a trailer containing the natural gas turbine and electric power generator combined with the Electronic Equipment and Control Room. The turbine sets 105 and 107 are supplied with natural gas on site and as their turbines spin they generate electric power. Examples of output of electricity range in potential from around 4180 V to around 15 kV. Any well known, natural gas powered turbine suitable to provide this amount or another similar potential of electricity is included in this disclosure. The two turbine sets 105 and 107 are electrically independent and run in tandem so that in case one loses power due to an overload, the other will not shut down leading to sand slurry hardening down-hole. In the embodiment shown in FIG. 1, there are ten total trailers, two turbine sets 105 and 107 taking up eight trailers and two trailers for the switchgears 109 and 111, but this configuration can be modified depending on the application.

The transformers 117 step down the voltage from 13.8 kV to 600 V and provide it to the pump trailers 119. The pump trailers 119 include electric motors (not shown), which in one example operate at 600 V each. The auxiliary trailers 113 and 115 can take the electricity at 13.8 kV from the switchgears 109 and 111 and provide 600 V to sand equipment 121, hydration unit 123, blender 125, crane 127, wireline tool trailer 129 and wireline truck 131. The auxiliary trailers 113 and 115 also include transformers for stepping down the voltage. Thus in an example, the fracturing system 100 provides electricity to wireline equipment 103 that can be used to conduct wireline operations in a wellbore, examples of which are provided in more detail below. It should be pointed out however, that the supply of electricity from the system 100 is not limited to wireline equipment 103, but can include any third party consumer of electricity.

A further embodiment of the present invention includes a novel design for the switchgears 109 and 111. Switchgears in an electrical system typically include a combination of electrical disconnect switches, fuses or circuit breakers used to control, protect, and isolate electrical equipment. They can be used to de-energize equipment to allow work to be done and to clear faults downstream. By way of background, oil and gas equipment is often transported across rough terrain and left in harsh weather conditions for the majority of its service life. Thus, the switchgear of the present technology is weatherproof and able to endure the wear and tear of mobilization. Shock absorbers can be placed in multiple locations, from the mounting bolts holding the switchgear housing to the trailer frame to the bolts holding externally mounted control panels in place.

According to some embodiments, air conditioning units can be installed within the switchgear to make sure the temperature of the internal electronics stay within their operating parameters and do not overheat. In one example embodiment, two air conditioners are used, but more or fewer can be included. In another embodiment, two air conditioners are installed, but only one is required to meet the cooling demands. This allows for redundancy in the event that an air conditioning unit fails.

In addition, external decks/walkways have handrails in place for safety which meet government safety standards, and the entire switchgear can be designed and built in accordance with government and industry standard regulations, such as NEMA, ANSI, and NFPA regulations.

The switchgears 109 and 111 can include safe and environmentally conscious vacuum circuit breakers. These breakers can be installed in draw-out enclosures which allow them to be removed and replaced in a timely manner and without dismantling the switchgear. The switchgear and breakers are designed in accordance with government and industry standards, including ANSI and IEEE standards C37.04, C37.06, and C37.20.2, and can have the following ratings: Maximum Voltage (rms): 13.8 kV, ANSI Rating Basis: MVA Rated, Operating Voltage: 13.8 kV, Short Circuit Current Rating: 25 KA, Close Voltage: 125 VDC, Trip Voltage: 125 VDC.

The ceiling and walls of the trailer housing for the switchgears 109 and 111 can be insulated with fire resistant material. This helps to prevent an ongoing fire in the case of an accidental arc flash or electric component failure. Furthermore, doors leading to the inside of the switchgear housing can be locked from the outside; thereby preventing access from any unauthorized and untrained workers. The doors, however, can still be opened from the inside, in order to prevent personnel from being accidentally locked inside. In addition, all external power cable plug-ins are clearly labeled and marked so personnel can see where a particular cable is connected without confusion. This will also prevent cables from being run to the wrong pieces of equipment.

According to some embodiments, the inside of the switchgear housing can be illuminated with standard 120 V LED lights to provide a well-illuminated internal working environment. If there is a loss of power on the switchgear trailer, a battery operated emergency light can be automatically activated. This will make sure that workers will always have a source of light for a safe working environment.

In addition, switchgears 109 and 111 can have the capability to receive an Emergency Power Off signal from a datavan. This signal is designed to shut down the compressors and any running equipment as well as disconnect the breakers in the switchgears. It is a hardwired connection that provides a failsafe in the event of an emergency. Also, the trailer can be equipped with standard air brakes and front landing gear to insure a stable base that will not shift or roll once the switchgear is in position and deployed at a well site.

Also included in certain embodiments of the present technology is a novel auxiliary trailer to provide power to the electric wireline equipment. In addition, a second auxiliary trailer can be included to provide additional power connections. In some embodiments, the auxiliary trailer can provide up to about 300 kVA or more of three phase electrical power using the same or a similar plug-in to other known sand equipment. A single cable can have three separate plugs, one for each phase, to connect to the auxiliary trailer. The attachment point on the sand equipment is a single plug containing three conductors on the auxiliary ends of a cable. The cable in one instance can be 240 feet long that uses single conductor plugs on the auxiliary end. The sand equipment can use a single large 3 conductor connection. Further, the sand equipment and the wireline equipment cable can be identical, but the wireline equipment can use a different plug such as three single conductor plugs to plug into the auxiliary trailer plug-in.

The auxiliary trailer can contain a 3500 kVA transformer which steps the 13.8 kV power from the turbines down to 600 V for use by the equipment. The turbines can be fueled by natural gas, thereby decreasing costs associated with fuel consumption, as well as emissions. During a wireline run (pump down), there are several megawatts of power available for use, and the wireline equipment may typically require only from about 250 kVA to about 300 kVA of that power.

In some embodiments of the invention, and in order to provide three-phase 550 V-600 V power at around 500 amperes, a diesel locomotive cable with internal conductors composed of stranded wire capable of sustaining this power draw while being able to plug into the auxiliary trailers 113 and 115 can be used. One end of the cable is compatible with the fracking equipment used at a particular well site, with a cable branch having three phases for connection into three power plugs, each color coded to its receptacle. The opposite end of the cable can be adapted to engage an available transformer or power junction box at or near the well site.

In yet another embodiment, an auxiliary unit is included that contains a variable frequency drive (VFD) housing (also referred to as a Power Control Room) and a transformer mounted onto a single trailer. It can be used to power and control equipment such as the blender discharge motor (1750 HP VFD drive), blender hydraulic motor (600 HP soft starter), and the hydration unit hydraulic motor (600 HP soft starter). Typically, the discharge motor on the blender can be speed controlled, the other two large motors be run on or off at a single speed. The VFD housing can also contain the soft starter for the smaller blower motors for cooling.

Power can be provided from the turbine generators of the turbine sets 105 and 107, to the switchgears 109 and 111, then to the auxiliary trailers 113 and 115. The transformer portion of the unit can be on the rear of the trailers sitting above the triple axles but can be unattached in some embodiments. The transformer portion can be used to convert power from 13.8 kV to 600 V to provide power to the VFD housing. The auxiliary unit VFD housing is similar to the VFD housing used on the fracking pumps.

The auxiliary unit can be used to provide power to the primary and secondary blenders, the hydration unit, the sand conveyor belt (Dual Belt), and the datavan. The addition of a second auxiliary trailer can help with power cable management by providing alternative cable routing options instead of trying to plug in all of the equipment spread out across location to a single auxiliary trailer. Having a second auxiliary also allows the use of two separate power grids, thereby increasing the redundancy of operations.

Two turbines can power a single switchgear, which in one example provides power to half of the fracking pumps, and a single auxiliary trailer. If one pair of turbines shuts down due to a mechanical failure, electrical fault, or overheating, the second pair of turbines allows flushing of the well, where all of the sand laden fluid still in the wellbore is displaced into the formation before it settles in the pipe to prevent a "screen out". The primary and secondary blenders can be powered by separate auxiliary trailers to allow for a quick blender swap to minimize downtime.

The auxiliary units can be modified to include connections for the wireline equipment. In addition, the sand equipment connections can be upgraded to allow use of the same plug points for sand as well as wireline. This way the two auxiliary units can be configured identically, with one powering sand equipment and the other powering wireline equipment. According to an alternate embodiment, plugs can be provided for sand and wireline equipment cables on all of the auxiliary units. According to yet another embodiment, plugs can be provided for sand equipment cables on one auxiliary trailer and different plugs for wireline equipment cables but not sand equipment cables on a second auxiliary trailer.

Figure 2:
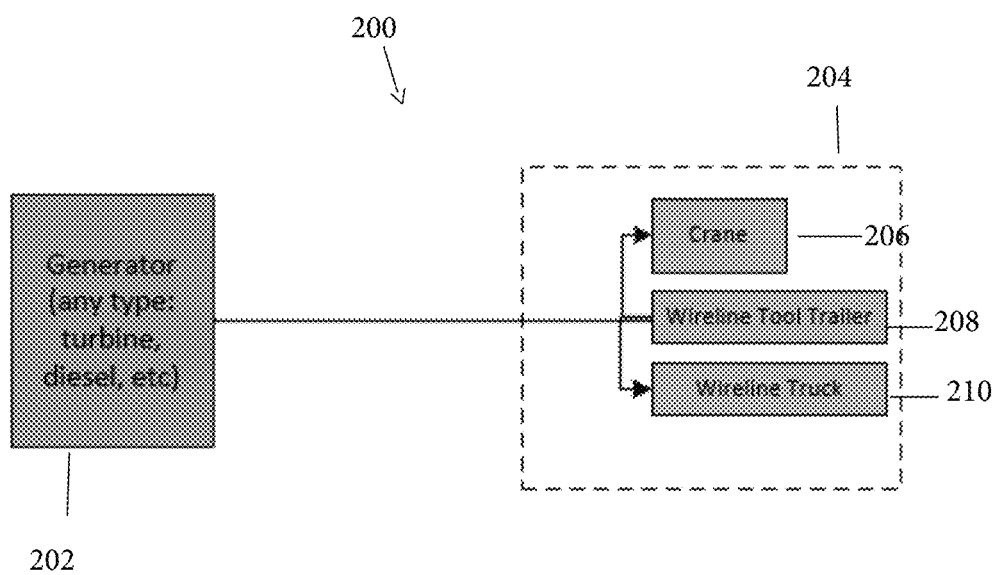
FIG. 2 is a block diagram of a second embodiment of the present invention.

FIG. 2, where a second embodiment of the system is schematically illustrated, shows a power generation system 200 with any type of generic electricity generator 202 powered by natural gas, diesel, or other hydrocarbon fuel sources, and having an electrical output connected to the wireline equipment 204, which includes a crane 206, wireline tool trailer 208, and wireline truck 210. In this example, the voltage is the same from the generator 200 to the fracturing equipment 204 at 600 V, and therefore a transformer is not needed to step down the power.

Figure 3:
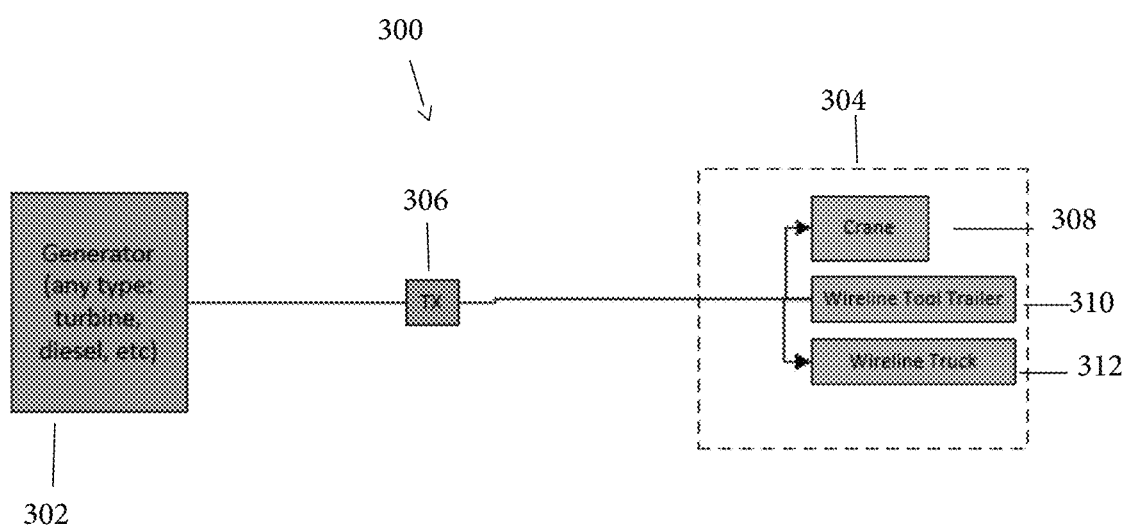
FIG. 3 is a block diagram of a third embodiment of the present invention.

Schematically depicted in FIG. 3 is a third embodiment of the invention which shows a power generation system 300 with a transformer 306 that either steps up the voltage from the generator 302 to the wireline equipment 304, or steps down the voltage from generator 302 to the wireline equipment 304. In this example the wireline equipment 304 includes the crane 308, the wireline tool trailer 310, and the wireline truck 312, which are powered at 600 V.

Figure 4:
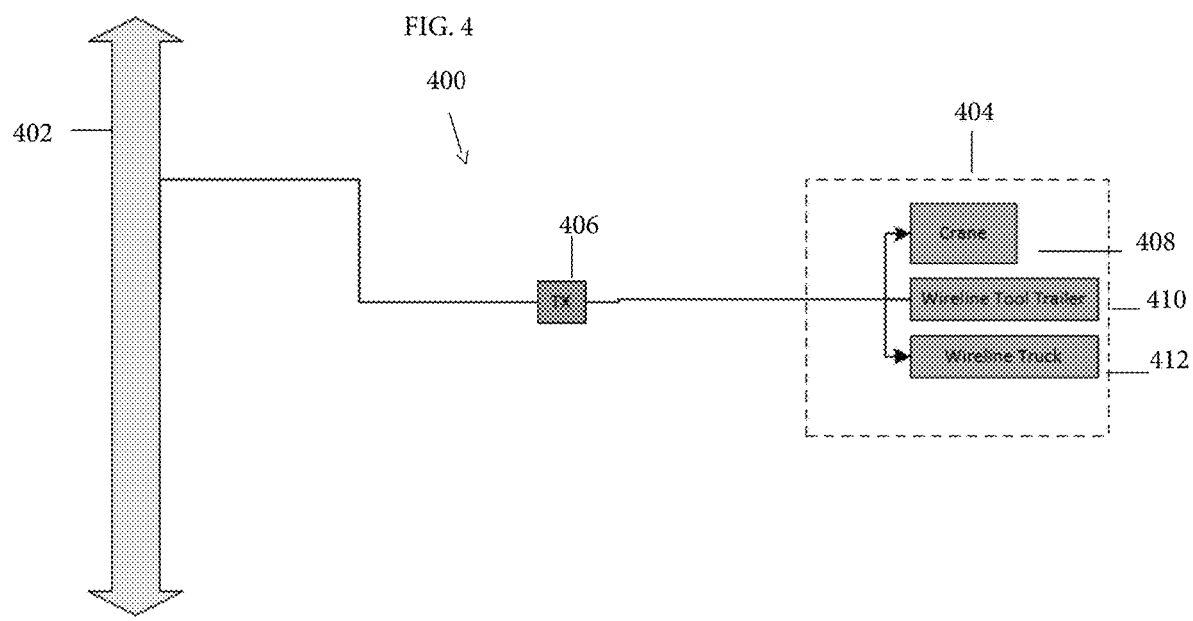
FIG. 4 is a block diagram of a fourth embodiment of the present invention.

FIG. 4 is a fourth embodiment of the invention and shows that the power can be pulled in the generation system 400 from a utility line 402 or generator which requires a higher voltage to minimize transmission loss. The system 400 of FIG. 4 also uses a transformer 406 to step down the voltage for the fracturing equipment 404, which includes a crane 408, a wireline tool trailer 410 and a wireline truck 412.

Referring now to FIG. 5, shown in a side sectional view is an example of a wireline system 500 for use with conducting wireline operations in a wellbore 502, where the wellbore 502 is shown intersecting a subterranean formation 504. The wireline system 500 includes a wireline truck 506 disposed on surface and proximate an opening of the wellbore 502. A wireline tool 508 is shown deployed on an end of a length of wireline 510 and disposed in the wellbore 502. Examples of the wireline (or downhole) tool 508 include a perforating gun, a plug, a formation logging tool, a cutting tool, a tubular inspection tool, strings of these tools, and combinations thereof. In the example of FIG. 5, a wellhead assembly 512 is optionally mounted at the opening of the wellbore 502, and through which the wireline 510 is inserted into the wellbore 502. The wireline system 500 is illustrated being in electrical communication with fracturing system 100 via power line 514. The power line 514 is illustrated connecting to an electrical panel 516 mounted on the wireline truck 506. Accordingly, electricity generated in the fracturing system 100, in addition to powering fracturing operations in a different wellbore, is directed to the wireline system 500 and used for energizing components of the wireline system 500. Examples of the components being energized include a winch or reel for raising and lowering the wireline 510, electronics in the wireline truck 506, and the wireline tool 508.

In one example where the wireline tool 508 is a perforating gun or string, delivering electricity to the perforating gun via the wireline 510 can initiate detonation of shaped charges (not shown) in the wireline tool 508. Detonating the shaped charges in turn creates metal jets that create perforations 518 extending through casing 520 that lines the wellbore 502 and into the surrounding formation 504. In an alternate embodiment, the wireline tool 508 can be deployed on coiled tubing (not shown), and where electrical and signal communication between the wireline tool 508 and surface can be via the wireline 510, or another communication means disposed in or with the coiled tubing that transfers signals and/or electricity. Examples of another communication means include conductive materials, such as metal or conductive composites, fiber optics, or wireless.

One significant advantage provided by the present invention is that it will allow the use of clean and quiet electric equipment for wireline to be used, further eliminating the need for diesel fuel. It will be a step towards creating a more environmentally conscious fracturing operation.

The power generation equipment can be trailer mounted, skid mounted, truck mounted, or permanently fixed depending upon the application. The transformer can be part of the auxiliary unit or separate stand-alone so that it can provide a bigger step down in electricity. Electricity can also be generated at a single voltage to be used in the equipment, eliminating the need for a transformer. The transformer can be used to provide any voltage required to power any wireline equipment; and using the system of the present invention, it will be possible to provide power to any third party company on a well site.

Various modifications can be made to the wireline power supply during electric fracturing operations system and method set forth in this Specification and these embodiments described are not intended to limit the scope of the invention.

What is claimed is:

1. A fracturing system comprising:
   a turbine generator having an electrical output;
   an electric motor that is in electrical communication with the electrical output;
   a variable frequency drive (VFD) connected to the electric motor to perform electric motor diagnostics to prevent damage to the electric motor;
   a fracturing pump that is driven by the electric motor;
   at least one weatherproofed switchgear trailer connected to the at least one turbine; and
   a wireline system that is in electrical communication with the electrical output via the at least one weatherproofed switchgear trailer, wherein the electrical output provided to the wireline system is adjusted via one or more transformers positioned between the at least one weatherproofed switchgear trailer and the wireline system.

2. The fracturing system of claim 1, wherein the wireline system comprises a wireline tool that is disposable in a wellbore that is selected from the group consisting of a perforating gun, a plug, a formation logging tool, a cutting tool, a casing imaging tool, and combinations thereof.

3. The fracturing system of claim 1, further comprising trailers that contain at least one power distribution panel.

4. The fracturing system of claim 3, where the trailers further contain receptacles for attaching cables that can sustain a power draw of equipment with three separate plugs for three phase power.

5. The fracturing system of claim 1, further comprising:
   one or more fracturing transformers associated with the fracturing pump, wherein the one or more fracturing transformers are 3500 KVA transformers to step 13.8 kV power from the turbine generator down.

6. The fracturing system of claim 1, further comprising:
a second VFD that supplies power and controls a blender discharge motor, wherein the blender discharge motor is speed controlled.

7. The fracturing system of claim 1, wherein the one or more transformers are separate from different transformers associated with the fracturing pump.

8. The fracturing system of claim 1, wherein the one or more transformers are configured to create a power grid separate from a fracturing power grid configured to power the electric motor.

9. The fracturing system of claim 1, wherein the one or more transformers comprise at least one emergency shut-off switch.

10. The fracturing system of claim 9, further comprising:
a datavan configured to provide control signals to the one or more transformers, wherein responsive to a signal from the datavan, the at least one emergency shut-off switch disconnects power provided to the wireline system.

11. The fracturing system of claim 1, further comprising:
a pump trailer supporting the electric motor, the fracturing pump, and the VFD.

* * * * *